(12) United States Patent
Zhong et al.

(10) Patent No.: US 9,153,812 B2
(45) Date of Patent: Oct. 6, 2015

(54) CYLINDRICAL BATTERY

(75) Inventors: Faping Zhong, Hunan (CN); Chathan Ho, Hunan (CN); Feng Chen, Hunan (CN)

(73) Assignee: Hunan Corun New Energy Co., Ltd., Changsha, Hunan (CN)

( * ) Notice: Subject to any disclaimer, the term of this patent is extended or adjusted under 35 U.S.C. 154(b) by 53 days.

(21) Appl. No.: 13/496,372

(22) PCT Filed: Sep. 25, 2009

(86) PCT No.: PCT/CN2009/074234
§ 371 (c)(1),
(2), (4) Date: Mar. 15, 2012

(87) PCT Pub. No.: WO2011/035476
PCT Pub. Date: Mar. 31, 2011

(65) Prior Publication Data
US 2012/0177959 A1    Jul. 12, 2012

(51) Int. Cl.
| | |
|---|---|
| H01M 2/26 | (2006.01) |
| H01M 2/04 | (2006.01) |
| H01M 2/06 | (2006.01) |
| H01M 10/04 | (2006.01) |
| H01M 10/6553 | (2014.01) |
| H01M 10/643 | (2014.01) |
| H01M 10/613 | (2014.01) |
| H01M 2/12 | (2006.01) |
| H01M 10/6551 | (2014.01) |

(52) U.S. Cl.
CPC ............ *H01M 2/263* (2013.01); *H01M 2/0413* (2013.01); *H01M 2/06* (2013.01); *H01M 10/0431* (2013.01); *H01M 10/613* (2015.04); *H01M 10/643* (2015.04); *H01M 10/6553* (2015.04); *H01M 2/1229* (2013.01); *H01M 10/6551* (2015.04); *Y10T 29/49108* (2013.01)

(58) Field of Classification Search
None
See application file for complete search history.

(56) References Cited

U.S. PATENT DOCUMENTS

| | | | | |
|---|---|---|---|---|
| 4,514,788 | A * | 4/1985 | Klaschka et al. ............ | 361/519 |
| 6,197,445 | B1 * | 3/2001 | Ward et al. .................... | 429/163 |
| 2006/0240317 | A1 * | 10/2006 | Phillips et al. ............... | 429/144 |

FOREIGN PATENT DOCUMENTS

| | | |
|---|---|---|
| CN | 101101980 A | 1/2008 |
| CN | 101101981 A | 1/2008 |

(Continued)

OTHER PUBLICATIONS

Nakai JP 2004-319311 A Machine translation.*
Nakai JP 2004-319311 A, Machine translation (Nov. 2004).*

*Primary Examiner* — Carlos Barcena
*Assistant Examiner* — Wojciech Haske
(74) *Attorney, Agent, or Firm* — Brinks Gilson & Lione

(57) ABSTRACT

A cylindrical battery comprises a cylindrical battery electrode assembly having two ends, which comprises a core bar, a positive plate and a negative plate coiled on the core bar, and a diaphragm separating the plates. The cylindrical battery also comprises a positive electrode lead-out terminal, disposed at one end of the electrode assembly and having an inner end surface facing the same. The inner end surface of the positive electrode lead-out terminal is directly connected with the entire end of the positive plate at the corresponding end of the electrode assembly. The cylindrical battery further comprises a negative electrode lead-out terminal, disposed at the other end of the electrode assembly and having an inner end surface facing the same. The inner end surface of the negative electrode lead-out terminal is directly connected with the entire end of the negative plate at the corresponding end of the electrode assembly.

16 Claims, 1 Drawing Sheet

(56) References Cited

FOREIGN PATENT DOCUMENTS

| CN | 101118959 A | 2/2008 |
| JP | 2000-243372 | 9/2000 |
| JP | 2001110371 A | 4/2001 |
| JP | 2003-229166 | 8/2003 |
| JP | 2004319311 A * | 11/2004 |
| JP | 2006-040771 | 2/2006 |

* cited by examiner

CYLINDRICAL BATTERY

This application is the national phase application of PCT Application No. PCT/CN2009/074234, filed on Sep. 25, 2009, the entirety of which is incorporated herein by reference.

FIELD

The invention relates to a secondary battery, specifically to a cylindrical secondary battery.

BACKGROUND

Currently, due to the global energy shortage as well as the increasing awareness of environmental protection, electric vehicle batteries and energy storage batteries are popular in the market. In general, high-capacity secondary batteries (nickel-hydrogen batteries, nickel-cadmium batteries, lithium batteries, lead-acid batteries, etc.) in the market are in rectangular shape, which is especially true with respect to nickel-hydrogen batteries. Nickel-hydrogen batteries having a capacity higher than 20 Ah adopt a rectangular shape, as it is difficult to dissipate heat in high-capacity batteries which are prone to thermal runaway. However, rectangular secondary batteries fail to meet market requirements due to inherent defects, while conventional cylindrical secondary batteries need to be improved in terms of high current charge-discharge capability and performance of dissipation of heat from inner parts of batteries. Furthermore, positive and negative plates of existing secondary batteries are solder-connected with lead-out terminals via lugs with soldering points soldering connecting pieces required. When current is large or battery short circuit occurs, the lugs or the connecting pieces are heated to be red-hot, which may cause battery burning or other severe safety accidents.

SUMMARY

In view of the defects of the prior art, the present disclosure provides a cylindrical battery with positive and negative electrodes disposed at two ends, so as to enable current of positive and negative plates to flow from the two ends, significantly increasing the high current charge-discharge capability and effectively improving the performance of heat dissipation in the battery and the safety property.

According to the technical scheme of the present disclosure, the cylindrical battery comprises a cylindrical battery electrode assembly, which is formed by coiling the positive plate and the negative plate separated by a diaphragm, and the electrode assembly is coiled on a core bar. The cylindrical battery is characterized in that an inner end surface of a positive electrode lead-out terminal located at one end of the cylindrical battery electrode assembly is directly connected with the entire end of the positive plate at the corresponding end of the cylindrical battery electrode assembly, and an inner end surface of a negative electrode lead-out terminal located at the other end of the cylindrical battery electrode assembly is directly connected with the entire end of the negative plate at the corresponding end of the cylindrical battery electrode assembly, so that a solderless surface contact bus structure is formed in such a manner that the positive and negative electrode lead-out terminals are respectively disposed at two ends of the battery.

Further description of the embodiments of the present invention is given as follows.

As shown in FIG. 1, the cylindrical battery comprises the cylindrical battery electrode assembly 1, which is formed by coiling the positive plate and the negative plate separated by the diaphragm and is coiled on the core bar 2. The cylindrical battery is characterized in that the inner end surface of the positive electrode lead-out terminal 3 located at one end (the left end as shown in FIG. 1) of the cylindrical battery electrode assembly 1 is directly connected with the entire end of the positive plate at the corresponding end (the left end as shown in FIG. 1) of the cylindrical battery electrode assembly 1, and the inner end surface of the negative electrode lead-out terminal 4 located at the other end (the right end as shown in FIG. 1) of the cylindrical battery electrode assembly 1 is directly connected with the entire end of the negative plate at the corresponding end (the right end as shown in FIG. 1) of the cylindrical battery electrode assembly 1, so that a solderless surface contact bus structure is formed in such a manner that the positive and negative electrode lead-out terminals are respectively disposed at two ends of the battery.

According to the present disclosure, as the positive and negative electrodes are respectively disposed at two ends of the battery, the current of the positive and negative plates flows from the two ends, greatly reducing the internal resistance of the battery and the generated heat as well. The direct connection (lug-free, solderless and direct surface connection) between the positive and negative electrode lead-out terminals and the entire electrode surfaces (the entire end surfaces) of the ends of the corresponding electrode slices significantly enhances the high current charge-discharge capability of the battery, ensures the safety of the battery during high current or short circuit under abnormal situation, makes heat in the battery dissipated with the heat-dissipating area (including two ends and a housing of the battery) being maximum, and remarkably improves the performance of heat dissipation in the battery. Additionally, if necessary, outer ends of the positive and negative electrode lead-out terminals are made to have a heat-dissipating fin structure or be connected with heat-dissipating fins, thereby more effectively improving heat dissipation in the battery. The cylindrical battery electrode assembly is coiled on the core bar, with no need of pulling out the roll core (core bar) on a coiling machine after the coiling, therefore avoiding battery short circuit or micro short circuit or formation of a pagoda shaped battery electrode assembly due to the diaphragm being torn out when the roll core is pulled out.

According to the present disclosure, at least two annular crimping grooves are pressed at two ends of the battery housing (steel housing) at positions corresponding to the peripheries of the positive and negative electrode lead-out terminals, and seal edges are pressed at ports. Such a structure enables the battery to have sufficient structural rigidity, and makes the internal pressure resistance of the battery equal to or greater than 100 Kg, thereby further achieving a qualitative leap in the safety performance of the battery.

From the above, the present disclosure provides a cylindrical battery, which has excellent high current charge-discharge capability and safety property and achieves low heat generation and effective heat dissipation in the battery.

Wherein:

| 1—cylidnrical battery electrode assembly | 2—core bar |
|---|---|
| 3—positive electrode lead-out terminal | 4—negative electrode lead-out terminal |
| 5—housing | 6—insulating rubber cover |
| 7—spring | 8—safety valve seat |
| 9—screw | 10—safety bonnet |
| 11—rubber ball | 12—rubber pad |
| 13—safety valve | |

DETAILED DESCRIPTION OF THE PREFERRED EMBODIMENTS

Figure 1:
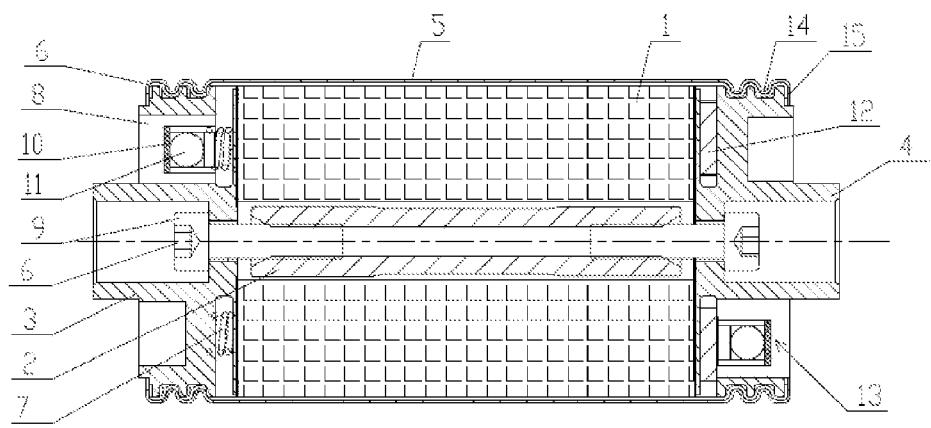
FIG. 1 is a longitudinal sectional view of the cylindrical battery according to one embodiment.
Figure 2:
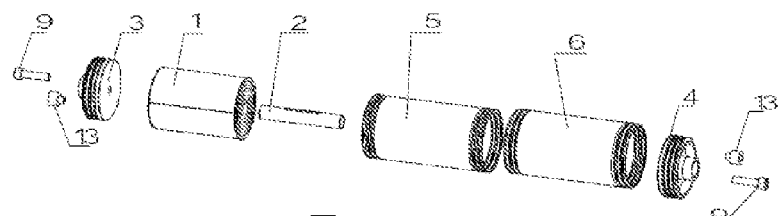
FIG. 2 is a stereoscopic structural view showing the separate state of various members of the cylindrical battery as shown in FIG. 1.

According to FIGS. 1 and 2, the cylindrical battery of the present disclosure comprises the cylindrical battery electrode assembly 1 which is formed by coiling the positive and negative plates separated by the diaphragm. The cylindrical battery electrode assembly 1 is coiled on the core bar 2 and installed in the housing 5, in which an insulating rubber cover 6 is lined. The inner end surface of the positive electrode lead-out terminal 3 located at one end of the cylindrical battery electrode assembly 1 is directly connected with the entire end of the positive plate at the corresponding end of the cylindrical battery electrode assembly 1, while the inner end surface of the negative electrode lead-out terminal 4 located at the other end of the cylindrical battery electrode assembly 1 is directly connected with the entire end of the negative plate at the corresponding end of the cylindrical battery electrode assembly 1, thereby forming the solderless surface contact bus structure in such a manner that the positive and negative electrode lead-out terminals are respectively disposed at two ends of the battery.

As shown in FIG. 1, the positive electrode lead-out terminal 3 and the negative electrode lead-out terminal 4 at two corresponding ends of the cylindrical battery electrode assembly 1 are connected with corresponding ends of the core bar 2 via screws 9, respectively, wherein the positive electrode lead-out terminal 3 and the negative electrode lead-out terminal 4 are made of metal materials or metals plated with corrosion-resistant materials.

The housing 5 of the battery can be made of metal materials (for example: a steel housing is applied), metals plated with corrosion-resistant materials, plastics or plastics plated with a metal film.

One or more safety valves 13 are installed at one or both ends of the battery, so as to ensure the safety of the battery when the battery is abused. The safety valve 13 can adopt a structure of the prior art, or can be a safety valve which is composed of a safety valve seat 8, a rubber ball 11 disposed in a front cavity of the safety valve seat 8 for sealing purpose and a safety bonnet 10 and is respectively arranged on the positive electrode lead-out terminal 3 or the negative electrode lead-out terminal 4, wherein the front cavity is communicated with an inner cavity of the battery via a channel.

Also, rear ends of the positive electrode lead-out terminal 3 and the negative electrode lead-out terminal 4 can be in respective connection with at least two annular crimping grooves pressed at two corresponding ends of the housing 5, and the seal edges 15 are pressed at two ports of the housing 5. Such a structure allows the battery to have sufficient structural rigidity, and enables the inner part of the battery to endure the pressure equal to or greater than 100 Kg, thereby sufficiently ensuring the explosion-proof safety performance of the battery.

When steel housing is used in the battery of the present disclosure, the steel housing also has the effect of heat dissipation. An insulating sleeve (such as an insulating rubber cover or one made of other heat-conductive insulating materials) is disposed in the steel housing. The cylindrical battery is the only one with a neutral metal housing, which is very important for electric vehicles.

In addition, the positive electrode lead-out terminal 3 and the negative electrode lead-out terminal 4 may also be provided with elastic component grooves, in which elastic components are placed for reliable contact connection of the positive electrode lead-out terminal 3 and the negative electrode lead-out terminal 4 with the entire ends of the corresponding positive and negative plates. The elastic components can be springs 7, rubber pads 12 or other suitable elastic components.

The battery of the present disclosure is tested through the method prescribed by the government, in terms of general capacity performance, normal-temperature high current performance, low temperature performance, high temperature performance, safety performance, self-discharge performance, etc. A battery of 30 Ah designed for HEV buses is taken as an example, and the test results show:

(a) A single battery can completely satisfy the safety requirement of public transportation means.

(b) From the perspective of high/low temperature performance of a single battery, the temperature range is relatively wide, from −30° C. to 65° C. The battery is able to work even at a temperature of 70° C. Whether the temperature is high or low, the battery can be charged and discharged in a high-current manner and is highly adaptive to the environment, especially to domestic regions and areas with large day-night temperature difference.

(c) With respect to the high current charge performance, a single battery can be successively charged at the rate of 10 C and with the constant power of 500 W. As to an energy packet formed by a combination of 270 single batteries, 135 KW large-power charging is allowed, the charging voltage is equal to or lower than 432 V (the actual 20-second pulse charging voltage of one single battery is 1.6 V), the peak power of a generator is more fully absorbed, and the high energy recovery ability and the energy-saving effect are achieved.

The detailed description of the present disclosure is given above. Specific examples are used for illustration of principles and implementation methods of the present disclosure, and the description of the above embodiments aims to provide help in understanding the methods and the core ideas of the present disclosure. Meanwhile, for a person having ordinary skill in the art, according to the ideas of the present disclosure, the specific implementation methods and the application range may be modified. In summary, the contents of the specification should not be understood as limiting the scope of the present disclosure.

What is claimed is:

1. A cylindrical battery comprising:
a cylindrical battery electrode assembly having two ends, the cylindrical battery electrode assembly comprising a core bar, a positive plate and a negative plate coiled on the core bar, and a diaphragm separating the positive and negative plates;

an integral positive electrode lead-out terminal disposed at one end of the cylindrical battery electrode assembly, the positive electrode lead-out terminal having an inner end surface facing the cylindrical battery electrode assembly, the inner end surface of the positive electrode lead-out terminal directly connected with the entire end of the positive plate at the corresponding end of the cylindrical battery electrode assembly;

an integral negative electrode lead-out terminal disposed at the other end of the cylindrical battery electrode assembly, the negative electrode lead-out terminal having an inner end surface facing the cylindrical battery electrode assembly, the inner end surface of the negative electrode lead-out terminal directly connected with the entire end of the negative plate at the corresponding end of the cylindrical battery electrode assembly;

a first groove disposed within the positive electrode lead-out terminal in a position adjacent to the inner end surface of the positive electrode lead-out terminal and a first elastic component disposed in the first groove, wherein the first elastic component facilitates the direct connection between the inner end surface of the positive electrode lead-out terminal and the entire end of the positive plate; and a second groove disposed within the negative electrode lead-out terminal in a position adjacent to the inner end surface of the negative electrode lead-out terminal and a second elastic component disposed in the second groove, wherein the second elastic component facilitates the direct connection between the inner end surface of the negative electrode lead-out terminal and the entire end of the negative plate.

2. The cylindrical battery of claim 1, wherein the connection between the inner end surface of the positive electrode lead-out terminal and the entire end of the positive plate is solderless.

3. The cylindrical battery of claim 1, wherein the connection between the inner end surface of the negative electrode lead-out terminal and the entire end of the negative plate is solderless.

4. The cylindrical battery of claim 1, wherein one or more safety valves are disposed on one or both ends of the cylindrical battery.

5. The cylindrical battery of claim 1, further comprising a housing.

6. The cylindrical battery of claim 5, wherein the housing is made of a metal material, a metal plated with a corrosion-resistant material, a plastic or a plastic plated with a metal material.

7. The cylindrical battery of claim 6, wherein the housing is made of a metal material.

8. The cylindrical battery of claim 5, further comprising at least two annular crimping grooves at both ends of the housing.

9. The cylindrical battery claim 1, wherein the elastic component is a spring or a rubber pad.

10. A method of manufacturing a cylindrical battery comprising:
providing a cylindrical battery electrode assembly having two ends, the cylindrical battery electrode assembly comprising a core bar, a positive plate and a negative plate coiled on the core bar, and a diaphragm separating the positive and negative plates;
connecting an integral positive electrode lead-out terminal to one end of the cylindrical battery electrode assembly such that the inner end surface of the positive electrode lead-out terminal faces the cylindrical battery electrode assembly and is directly connected with the entire end of the positive plate at the corresponding end of the cylindrical battery electrode assembly;
connecting an integral negative electrode lead-out terminal to the other end of the cylindrical battery electrode assembly such that the inner end surface of the negative electrode lead-out terminal faces the cylindrical battery electrode assembly and is directly connected with the entire end of the negative plate at the corresponding end of the cylindrical battery electrode assembly;
providing a first groove within the positive electrode lead-out terminal in a position adjacent to the inner end surface of the positive electrode lead-out terminal;
disposing a first elastic component in the first groove, wherein the first elastic component facilitates the direct connection between the inner end surface of the positive electrode lead-out terminal and the entire end of the positive plate;
providing a second groove within the negative electrode lead-out terminal in a position adjacent to the inner end surface of the negative electrode lead-out terminal; and
disposing a second elastic component in the second groove, wherein the second elastic component facilitates the direct connection between the inner end surface of the negative electrode lead-out terminal and the entire end of the negative plate.

11. The method of claim 10, wherein the connection between the inner end surface of the positive electrode lead-out terminal and the entire end of the positive plate is solderless.

12. The method of claim 10, wherein the connection between the inner end surface of the negative electrode lead-out terminal and the entire end of the negative plate is solderless.

13. The method of claim 10, further comprising disposing one or more safety valves on one or both ends of the cylindrical battery.

14. The method of claim 10, further comprising providing a housing.

15. The method of claim 10, further comprising pressing at least two annular crimping grooves at both ends of the housing.

16. The method of claim 10, wherein the elastic component is a spring or a rubber pad.

* * * * *